No. 890,133. PATENTED JUNE 9, 1908.
L. L. GAGHAGEN.
GOVERNOR.
APPLICATION FILED AUG. 14, 1905.
2 SHEETS—SHEET 2.
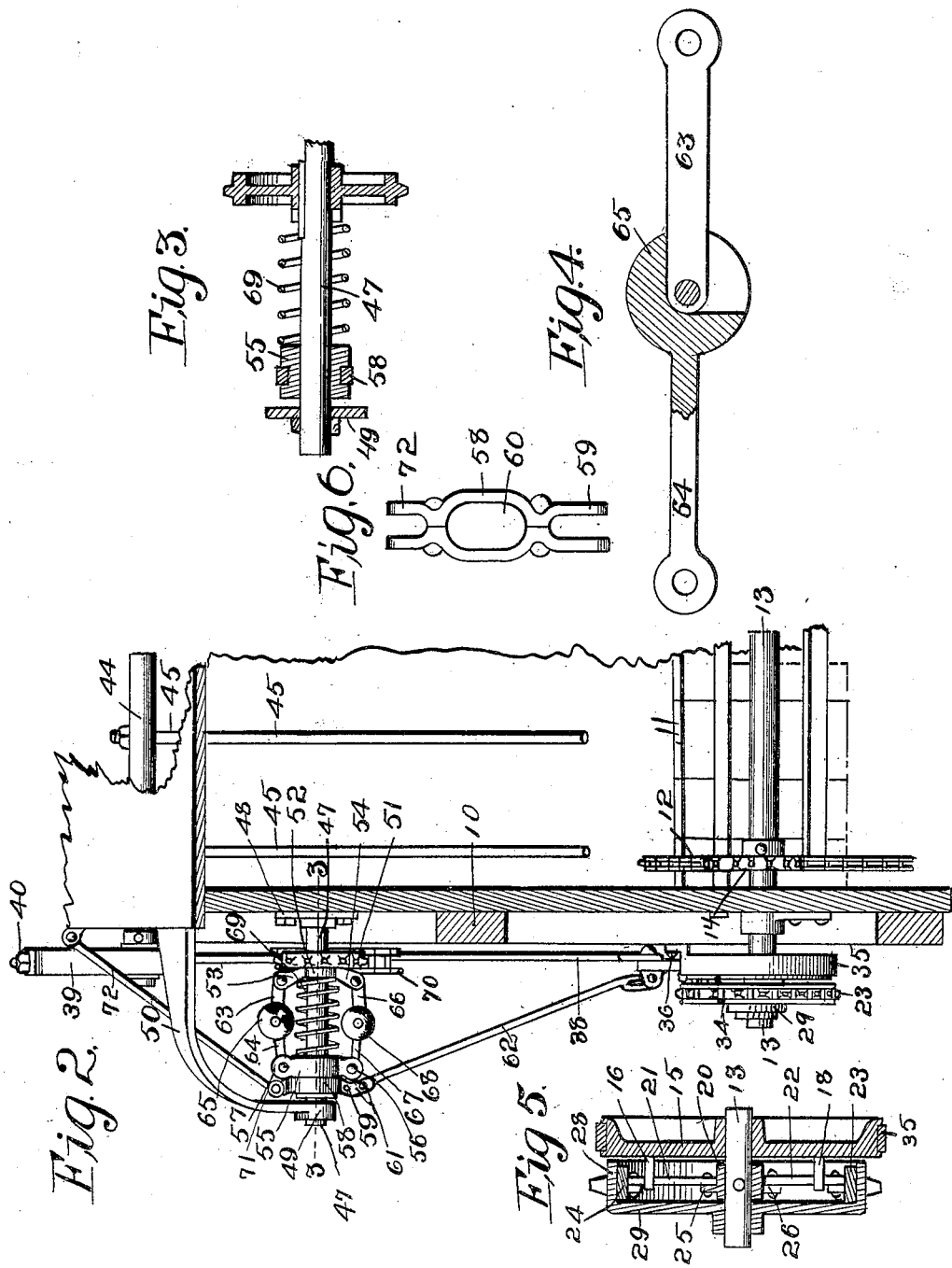
Witnesses
A. G. Hague
Sidney F. Christy.
Inventor: L. L. Gaghagen
By Orwig & Lane, Attys

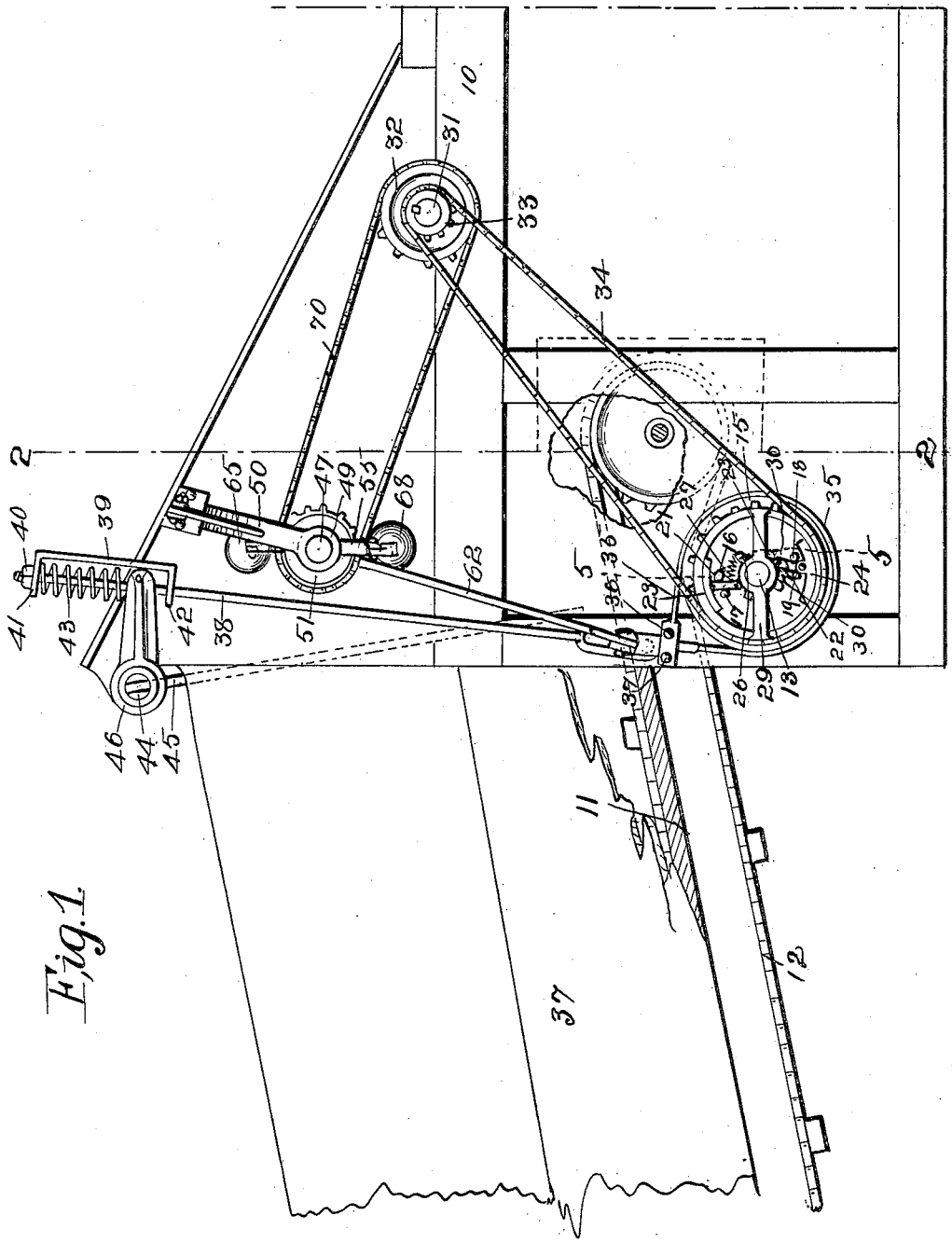

UNITED STATES PATENT OFFICE.

LEMUEL L. GAGHAGEN, OF NEWTON, IOWA.

GOVERNOR.

No. 890,133.　　　　Specification of Letters Patent.　　　　Patented June 9, 1908.

Application filed August 14, 1905. Serial No. 274,214.

*To all whom it may concern:*

Be it known that I, LEMUEL L. GAGHAGEN, a citizen of the United States, residing at Newton, in the county of Jasper and State of Iowa, have invented a certain new and useful Governor, of which the following is a specification.

The objects of my invention are to provide a governor for band cutters and feeders and other machines, which is actuated by the material or substance advanced by the conveying mechanism in the device to which it is attached, and by a spring which is controlled by the rotary speed of the driving shaft of the machine to which it is attached.

A further object is to provide a device of this class of simple, durable and inexpensive construction which can be easily attached to the device which it is to govern, and which will occupy a minimum amount of space and have the desirable effect of regulating and controlling the feeding portion of the device; that is, the conveyer which advances the grain or other substance to the cutting mechanism.

My invention consists in certain details in the construction, arrangement and combination of the various parts of the device, whereby the objects contemplated are attained, as hereinafter more fully set forth, pointed out in my claims and illustrated in the accompanying drawings, in which—

Figure 1 is a side elevation of my device. This view also shows a portion of the band cutter and feeder frame to which the governor is attached. Fig. 2 is a sectional view of the band cutter and feeder frame cut on the line 2—2 of Fig. 1, showing the way of attaching the device to the frame of the band cutter and feeder. Fig. 3 is a sectional view of a portion of the device cut on the line 3—3 of Fig. 2. Fig. 4 is a detail view, part of which is shown in section, showing one of the balls and its attachments which is used in the governor, and Fig. 5 is a sectional view of the band wheel and sprocket which operates it, cut on the line 5—5 of Fig. 1. Fig. 6 is a detail elevation of one of the sliding collars.

Referring to the accompanying drawings, I have used the reference numeral 10 to indicate the frame of the band cutter and feeder or other device to which my governor is to be attached.

The numeral 11 indicates the conveyer frame which is secured to the frame 10, having the conveyer 12 passing around its bottom portion, which conveyer 12 is operated by the driven shaft 13 which has a sprocket wheel 14 on each end of it for driving the conveyer 12.

Rotatably mounted on the driven shaft 13, near one end thereof and outside of the frame 10 is a band wheel 15 having the pins 16, 17, 18 and 19 extending outwardly therefrom. Outside the band wheel 15 is a hub 20 to which the arms 21 and 22 are pivotally attached and on diametrically opposite sides of the hub, the arm 21 passing between the pins 16 and 17 which maintain it in position, and the arm 22 passing between the pins 18 and 19 which maintains this arm in position, Pivotally attached to the outer end of the arm 21 is a curved shoe 23. Pivotally attached to the outer end of the arm 21 is a curved shoe 24. Extending outwardly from the hub 20 are two lugs 25 and 26. Mounted between the arm 21 and the lugs 26 is a spring 27 designed to normally hold the brake shoe 23 at its outer limit of movement, and in engagement with the interior side of the flange 28 of the flanged sprocket wheel 29 which is rotatably mounted on the driven shaft 13 outside of the hub 20.

Mounted between the lugs 25 and the arm 22 is a spring 30, designed to normally maintain the shoe 24 at its outer limit of movement and in engagement with the flange 28 of the flanged sprocket wheel 29. Mounted at the rear of the driven shaft 13 and in the frame 10 is the driving shaft 31 having the sprocket wheels 32 and 33 mounted on that portion of it which is outside the frame 10. Passing around the sprocket wheel 33 and the flanged sprocket wheel 29 is a sprocket chain 34, so arranged that as the driving shaft is rotated, the flanged sprocket wheel 29 will be rotated in the same direction. As the flanged sprocket wheel 29 is rotated, the springs 27 and 30 will hold the curved shoes 23 and 24 in engagement with the inner side of the flange 28, so that as this flanged sprocket wheel is driven, the shaft 13 will be driven through the brake shoes, and their connections with the shaft 13. The band wheel 15 will also be driven by means of the pins 16 and 17 and 18 and 19, which are secured to the band wheel 15 and engage the arms 21 and 22 respectively.

Secured at one end to a point on the frame immediately above and in front of the band wheel 15 is a band 35 which extends from its point of attachment around the band wheel 15 and upwardly through a loop formed by the band and the bolts 36 and 37 from its attachment to the frame 10 above described. Pivotally secured to the inner side of the band and to its free end is a rod 38 which extends upwardly from the free end of the band through a yoke 39, and has secured to its upper end and above the yoke a nut 40. Mounted between the arms 41 and 42 of the yoke 39 is a coil spring 43. Extending across the upper forward portion of the frame 10 is a rock shaft 44, having a series of rods 45 depending therefrom, the lower ends of which extend to a position some distance above the delivery end of the conveyer 12.

Attached to one end of the shaft 44 and outside of the frame 10 is an arm 46, the free end of which is forked, and this forked portion engages the lower portion of the coil spring 43 and is on each side of the rod 38 and between the lower end of the coil spring 43 and the arm 42 of the yoke 39. As the conveyer is ordinarily driven, and when the bundles of straw are fed by it through the machine with uniformity and in the ordinary amounts, this straw will pass beneath the free ends of the rods 45. When, however, the straw is being fed in excessive quantities, the free ends of the rods will be engaged by the passing straw, and these rods will be forced rearwardly at their free ends, and this will cause the arm 46 to be forced upwardly at its free end, and consequently draw the rod 38 upwardly and cause the band 35 to be drawn tightly around the band wheel 15, which will act as a brake to this band wheel and will prevent it from rotating. This will cause the pins 16 and 17 and 18 and 19 respectively to throw the curved shoes 23 and 24 out of engagement with the flange 28 of the flanged sprocket wheel 29 against the resistance of the springs 27 and 30, and thus throw the driven shaft 13 out of operation. As soon as the straw has been withdrawn from the free ends of the rods 45, the springs will normally force the curved shoes back to position in engagement with the flange 28 of the sprocket wheel 29, and the band 35 will be loosened from the band wheel and the driven shaft be allowed to operate. The object of the spring 43 is to allow the band to yield slightly in being tightened around the band wheel, so as not to stop the conveyer too abruptly as it is being operated. The tension of this spring 43 can be adjusted by the nut at the upper end of the rod 38.

Extending outwardly from the frame 10 and at the rear of the rod 38 is a rotatably mounted shaft 47 which is mounted at its inner end in a bearing 48 secured to the side of the flange 10. The outer end of this shaft is mounted in a bearing 49 which is supported by the arm 50, which arm is secured to the side of the frame 10 at a point above the bearing 48. Secured to the shaft 47 is a sprocket wheel 51 having secured to its outer face the lug bearing collar 52, having the lugs 53 and 54 extending outwardly from it. Slidingly mounted on the shaft 47 and inside the bearing 49 is a collar 55 having the two lugs 56 and 57 extending outwardly from it. Slidingly mounted on the collar 55 and capable of vertical movement outside of the collar 55 is a collar 58. The collar 58 has the bifurcated lug 59 extending downwardly from it. This lug 59 has a slot 60 between its bifurcated portions. A bolt 61 passes through the lug 59 and the upper end of the rod 62, the upper end of which is in the slot 60 and which is pivotally and slidingly connected at its lower end to the free end of the band 35. Pivoted to the lugs 53 and 57 are the levers 63 and 64 having the ball 65 pivoted between their adjacent ends. Pivoted between the lugs 54 and 56 are the levers 66 and 67 having a ball 68 pivoted between their free ends. Mounted between the collar 52 and the collar 55 is a coil spring 69, which spring is designed to hold the collar 55 at its limit of movement away from the collar 52. Passing around the sprocket wheel 51 and the sprocket wheel 32 is a sprocket chain 70, so arranged that as the sprocket wheel 32, which is mounted on the driving shaft, is driven, the shaft 47 will be correspondingly driven. The construction just described is the ordinary ball governer now in use, and for the sake of convenience, it will be termed a ball governor.

Attached to the upper portion of the collar 55 is a lug 71 having pivoted to its upper end a rod 72 which rod is pivoted at its upper end to the side of the frame 10. The rods 62 and 72 are thus arranged to cause the collar 55 to move outwardly and inwardly in the proper path as the ball governor is operated. When the driving shaft is being rotated at a normal rate of speed; that is, for operating the device to which it is attached, the balls in the ball governor will be thrown away from each other, and the spring 69 will be compressed and allow the conveyer 12 to operate freely. When the speed is decreased sufficiently so that the feeding by the conveyer 12 is too rapid for the mechanism into which it is fed, the spring 69 will force the collars 55 and 58 outwardly, draw upwardly on the rod 62 and tighten the band 35 around the band wheel 15 and throw the driven shaft 13 out of operation until the speed is increased, and at this time the governor will cause the band to be automatically released and allow the driving shaft 13 to be driven.

The device is of great practical use in that the action of a feed governor and a speed governor on the band wheel to throw into or out of operation the feeding conveyer makes a much simpler and better controlled construction for the operation of devices of this class.

Having thus described my invention, what I claim and desire to secure by Letters Patent of the United States, therefor is—

1. In a device of the character described the combination of a driving shaft, a conveyer operated thereby, a driven shaft connected with said driving shaft, a band wheel rotatably mounted on said driven shaft, a band encircling said wheel, two operating rods connected with said band, a rock shaft for reciprocating one of said rods, said shaft being provided with a plurality of depending fingers located over said conveyer, whereby an excess of material advanced by the conveyer will engage said fingers to oscillate the rock shaft, thereby tightening the said band, and a centrifugal device operatively connected with said driving shaft and the other operating rod for tightening the band when the driving shaft attains a predetermined speed.

2. In a device of the character described the combination of a driving shaft, a conveyer operated thereby, a driven shaft connected with said driving shaft, a band wheel rotatably mounted on said driven shaft, a band encircling said wheel, two operating rods connected with said band, a rock shaft for reciprocating one of said rods, said shaft being provided with a plurality of depending fingers located over said conveyer, whereby an excess of material advanced by the conveyer will engage said fingers to oscillate the rock shaft, thereby tightening the said band, a centrifugal governor, and a collar loosely mounted on the shaft of said governor and connected to the other operating rod, whereby the band will be tightened when the driving shaft attains a predetermined speed.

LEMUEL L. GAGHAGEN.

Witnesses:
JULIA B. SMUTNEY,
W. R. LANE.